US010760781B2

(12) United States Patent
Lax et al.

(10) Patent No.: US 10,760,781 B2
(45) Date of Patent: *Sep. 1, 2020

(54) LIGHT FIXTURE AND WIREWAY ASSEMBLY (71) Applicant: Autronic Plastics, Inc., Central Islip, NY (US)

(72) Inventors: Daniel A. Lax, Roslyn, NY (US); Michael Thomas Spinosa, East Islip, NY (US)

(73) Assignee: Autronic Plastics, Inc., Central Islip, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/593,652

(22) Filed: Oct. 4, 2019

(65) Prior Publication Data

US 2020/0032992 A1 Jan. 30, 2020

Related U.S. Application Data (63) Continuation of application No. 16/259,477, filed on Jan. 28, 2019, now Pat. No. 10,443,827.

(Continued)

(51) Int. Cl.
*F21V 23/02* (2006.01)
*F21V 23/00* (2015.01)
*F21V 21/03* (2006.01)
*F21K 9/23* (2016.01)
*F21K 9/238* (2016.01)
*F21Y 115/10* (2016.01)

(52) U.S. Cl.
CPC .......... *F21V 23/023* (2013.01); *F21K 9/238* (2016.08); *F21V 21/03* (2013.01); *F21V 23/001* (2013.01); *F21Y 2115/10* (2016.08)

(58) Field of Classification Search
CPC ...... F21V 23/023; F21V 21/03; F21V 23/001; F21K 9/238; F21Y 2115/10
USPC ........................................................ 362/249
See application file for complete search history.

(56) References Cited

U.S. PATENT DOCUMENTS 2,463,046 A 9/1945 Naysmith
2,527,216 A 4/1947 Harris
(Continued)

FOREIGN PATENT DOCUMENTS

KR 1487340 B1 * 2/2015
WO 2014134608 A2 9/2014

OTHER PUBLICATIONS

Jul. 27, 2016 MTA NYCT Enhanced Station Initiative Program Design Criteria Manual; Contract A-36622A.
(Continued)

*Primary Examiner* — Jeanette E Chapman
(74) *Attorney, Agent, or Firm* — Zollinger & Burleson Ltd.

(57) ABSTRACT

A light fixture and wireway assembly is provided in a low-profile configuration wherein at least a portion of a plurality of wireways are disposed in a stacked configuration with a low-profile, edge-lit LED light engine. In one configuration, at least portions of two to four individual wireways are disposed in a stacked configuration with a low-profile, edge-lit LED light engine powered by an LED power supply also disposed within the outer perimeter of the overall assembly. Each wireway can be accessed through a single wireway wall without requiring conduit outside of the outer perimeter of the assembly.

37 Claims, 10 Drawing Sheets

Related U.S. Application Data (60) Provisional application No. 62/623,431, filed on Jan. 29, 2018.

(56) References Cited

U.S. PATENT DOCUMENTS

| | | | |
|---|---|---|---|
| 2,673,286 A | 3/1954 | Moore | |
| 3,504,172 A * | 3/1970 | Liberman | F21S 2/00 362/150 |
| 3,746,921 A | 7/1973 | Marshall et al. | |
| 4,369,487 A | 1/1983 | Carlow | |
| 4,627,679 A | 12/1986 | Billette de Villemeur et al. | |
| 4,907,767 A * | 3/1990 | Corsi | H02G 3/0418 138/162 |
| 5,024,614 A * | 6/1991 | Dola | H02G 3/0431 174/486 |
| 5,062,246 A | 11/1991 | Sykes | |
| 5,608,375 A | 3/1997 | Kosich | |
| 5,792,992 A * | 8/1998 | Handler | H02G 3/0431 174/101 |
| 6,072,708 A | 6/2000 | Fischer | |
| 6,283,621 B1 | 9/2001 | Macri | |
| 6,323,421 B1 * | 11/2001 | Pawson | H02G 3/0418 174/503 |
| 6,513,289 B1 * | 2/2003 | Decore | H02G 3/0406 16/225 |
| 6,739,734 B1 | 5/2004 | Hulgan | |
| 7,086,747 B2 | 8/2006 | Nielson et al. | |
| 7,140,742 B2 | 11/2006 | Pohlert et al. | |
| 7,227,278 B2 | 6/2007 | Realmuto et al. | |
| 7,229,185 B1 | 6/2007 | Galvez et al. | |
| 7,360,929 B2 | 4/2008 | Pfund et al. | |
| 7,387,407 B2 | 6/2008 | Tseng | |
| 7,470,036 B2 | 12/2008 | Deighton et al. | |
| 7,663,898 B2 | 2/2010 | Lindemann et al. | |
| 7,922,354 B2 | 4/2011 | Everhart | |
| 7,926,982 B2 | 4/2011 | Liu | |
| 7,972,035 B2 | 7/2011 | Boyer | |
| 8,018,161 B2 | 9/2011 | Smith, III et al. | |
| 8,294,379 B2 | 10/2012 | Liu et al. | |
| 8,299,712 B2 | 10/2012 | Smith, III et al. | |
| 8,313,211 B2 | 11/2012 | Libohova et al. | |
| 8,339,069 B2 * | 12/2012 | Chemel | H05B 47/155 315/297 |
| 8,376,583 B2 | 2/2013 | Wang et al. | |
| 8,531,134 B2 * | 9/2013 | Chemel | F21S 4/28 315/308 |
| 8,814,376 B2 | 8/2014 | Nicolai et al. | |
| 9,316,370 B2 | 4/2016 | Lax et al. | |
| 9,425,649 B2 | 8/2016 | Singer et al. | |
| 9,625,139 B2 | 4/2017 | Lax et al. | |
| 9,672,700 B2 | 6/2017 | Lax | |
| 9,897,305 B2 | 2/2018 | Ryder et al. | |
| 9,909,748 B2 | 3/2018 | Lax et al. | |
| 10,386,027 B1 | 8/2019 | Lax et al. | |
| 10,443,827 B2 * | 10/2019 | Lax | F21V 23/001 |
| 2002/0193955 A1 | 12/2002 | Bertness et al. | |
| 2003/0072145 A1 | 4/2003 | Nolan et al. | |
| 2004/0160199 A1 | 8/2004 | Morgan et al. | |
| 2004/0257789 A1 | 12/2004 | Nielson et al. | |
| 2005/0018435 A1 | 1/2005 | Selkee et al. | |
| 2005/0174755 A1 | 8/2005 | Becker | |
| 2005/0190078 A1 | 9/2005 | Salter | |
| 2005/0221659 A1 | 10/2005 | Mrakovich et al. | |
| 2005/0254237 A1 | 11/2005 | Nath et al. | |
| 2006/0215422 A1 | 9/2006 | Laizure, Jr. et al. | |
| 2007/0064450 A1 | 3/2007 | Chiba et al. | |
| 2007/0070622 A1 | 3/2007 | Allen | |
| 2007/0189001 A1 | 8/2007 | Nielson et al. | |
| 2007/0195527 A1 | 8/2007 | Russell | |
| 2007/0222399 A1 | 9/2007 | Bondy et al. | |
| 2007/0247842 A1 | 10/2007 | Zampini et al. | |
| 2007/0274084 A1 | 11/2007 | Kan et al. | |
| 2008/0080162 A1 | 4/2008 | Wilcox et al. | |
| 2008/0155915 A1 | 7/2008 | Howe et al. | |
| 2008/0212319 A1 | 9/2008 | Klipstein | |
| 2008/0265799 A1 | 10/2008 | Sibert | |
| 2008/0297701 A1 | 12/2008 | Lee et al. | |
| 2010/0019690 A1 | 1/2010 | Libohova et al. | |
| 2010/0148697 A1 | 6/2010 | Bayat et al. | |
| 2010/0244721 A1 | 9/2010 | Shloush et al. | |
| 2010/0296285 A1 | 11/2010 | Chemel et al. | |
| 2010/0296536 A1 | 11/2010 | Tao | |
| 2011/0058358 A1 | 3/2011 | Soo et al. | |
| 2012/0007516 A1 | 1/2012 | Lax et al. | |
| 2012/0080944 A1 | 4/2012 | Recker et al. | |
| 2012/0127702 A1 | 5/2012 | Lax et al. | |
| 2012/0168576 A1 | 7/2012 | Intravatola | |
| 2013/0201658 A1 | 8/2013 | Bogart et al. | |
| 2014/0226072 A1 | 8/2014 | Ikuta | |
| 2014/0240966 A1 | 8/2014 | Garcia et al. | |
| 2014/0254132 A1 | 9/2014 | Nicolai et al. | |
| 2014/0320011 A1 | 10/2014 | Hegarty | |
| 2015/0009666 A1 | 1/2015 | Keng et al. | |
| 2015/0330587 A1 | 11/2015 | Lax et al. | |
| 2015/0338084 A1 | 11/2015 | Ryder et al. | |
| 2016/0035192 A1 | 2/2016 | Lax | |
| 2016/0102825 A1 | 4/2016 | Scribante et al. | |
| 2016/0323981 A1 | 11/2016 | Clark et al. | |
| 2017/0138758 A1 | 5/2017 | Ricci | |
| 2017/0254517 A1 * | 9/2017 | Nijkamp | A01G 9/20 |

OTHER PUBLICATIONS

Jul. 26, 2016 Platform Component Details NCCT Contract A-36622A.

Lax et al., U.S. Appl. No. 15/807,481, filed Nov. 8, 2017.

United States District Court for the Eastern District of New York Central Islip Division, Case 2:19-cv-06268-MKB-ST, Document 1, filed Nov. 6, 2019, Complaint (114 pages).

United States District Court for the Eastern District of New York Central Islip Division, Case 2:19-cv-06268-MKB-ST, Document 14, filed Dec. 3, 2019, Answer, and Verified Counterclaims for Tortious Interference with Contractual Relations, Tortious Interference with Prospective Business Advantage, and for Declaratory Judgment of Noninfringement and Invalidity (58 pages).

United States District Court for the Eastern District of New York Central Islip Division, Case 2:19-cv-06268-MKB-ST, Document 16, filed Dec. 3, 2019, Order to Show Cause for Preliminary Injunction with temporary Restraining Order (3 pages).

United States District Court for the Eastern District of New York Central Islip Division, Case 2:19-cv-06268-MKB-ST, Document 17, filed Dec. 3, 2019, Memorandum of Law in Support of Defendants—Counterclaim Plaintiff's Motion for a Temporary Restraining Order and Preliminary Injunction (15 pages).

United States District Court for the Eastern District of New York Central Islip Division, Case 2:19-cv-06268-MKB-ST, Document 18, filed Dec. 3, 2019, Declaration as to Compliance with Local Civil Rule 6.1(d) and Fed. R. Civ. R 65(b) (3 pages).

United States District Court for the Eastern District of New York Central Islip Division, Case 2:19-cv-06268-MKB-ST, Document 19, filed Dec. 3, 2019, Letter to Honorable Roslynn R. Mauskopf, U.S.D.J. (2 pages).

United States District Court for the Eastern District of New York Central Islip Division, Case 2:19-cv-06268-MKB-ST, Document 21, filed Dec. 5, 2019, Plaintiff Clear-vu's Opposition to Defendant Apogee's Motion for a Temporary Restraining Order and preliminary Injunction (19 pages).

United States District Court for the Eastern District of New York Central Islip Division, Case 2:19-cv-06268-MKB-ST, Document 23, filed Dec. 13, 2019, Letter to Honorable Roslynn R. Mauskopf, U.S.D.J. (1 page).

United States District Court for the Eastern District of New York Central Islip Division, Case 2:19-cv-06268-MKB-ST, Document 24, filed Dec. 16, 2019, Apogee's Reply and Notice of Withdrawal of Request for a preliminary Injunction (4 pages).

United States District Court for the Eastern District of New York Central Islip Division, Case 2:19-cv-06268-MKB-ST, Document 30, Letter to Douglas C. Palmer, Clerk of Courts, reporting related case (2 pages).

(56) References Cited

OTHER PUBLICATIONS

United States District Court for the Eastern District of New York, Case 1:20-cv-00470-MKB, Document 1, Complaint (138 pages).
United States District Court for the Eastern District of New York Central Islip Division, Case 2:19-cv-06268-MKB-ST, Document 33, First Amended Answer and Counterclaims (37 pages).
United States District Court for the Eastern District of New York Central Islip Division, Case 2:19-cv-06268-MKB-ST, Document 34, Letter to The Honorable Steven L. Tiscione, reporting Discovery Plan Worksheet (6 pages).
United States District Court for the Eastern District of New York Central Islip Division, Case 2:19-cv-06268-MKB-ST, Document 36, Letter to The Honorable Margo K. Brodie, Pre-motion Conference Letter (3 pages).
United States District Court for the Eastern District of New York Central Islip Division, Case 2:19-cv-06268-MKB-ST, Document 38, Civil Minute Entry (1 page).
United States District Court for the Eastern District of New York Central Islip Division, Case 2:19-cv-06268-MKB-ST, Document 40, Answer of Defendant Smalls Electrical Construction, Inc. (9 pages).
United States District Court for the Eastern District of New York Central Islip Division, Case 2:19-cv-06268-MKB-ST, Document 42, Notice of Plaintiff's Motion to Dismiss Defendant's Counterclaim for Tortious Interference with Prospective Business Advantage (69 pages).
United States District Court for the Eastern District of New York Central Islip Division, Case 2:19-cv-06268-MKB-ST, Document 43, Reply Brief in Support of Plaintiff's Motion to Dismiss Defendant's Counterclaim for Tortious Interference with Prospective Business Advantage (14 pages).
United States District Court for the Eastern District of New York Central Islip Division, Case 2:19-cv-06268-MKB-ST, Document 44, Apogee's Brief in Opposition to Plaintiff's Motion to Dismiss Defendant's Counterclaim for Tortious Interference with Prospective Business Advantage (26 pages).
United States District Court for the Eastern District of New York Central Islip Division, Case 2:19-cv-06268-MKB-ST, Document 46, [Proposed] Protective Order Regarding the Disclosure and Use of Discovery Materials (20 pages).
Philips Lumileds Press Information, Jan. 23, 2007.
ProTran 1, 120 VAC LED Safety Light, Sep. 12, 2008.
ProTran 1, 1000VDC LED Safety Light, Sep. 12, 2008.
ProTran 1, 1000VDC White LED Portable Lamp Bank for MOW, Dec. 20, 2008.
Lumascape, LED Product Catalogue 2008, Mar. 2008.
Copyright 2014, Apogee Translite, Inc., series 98J LED, Spec Sheet.
Apogee Translite, Series 70 LED Tunnel Light webpage, copyright 2015, accessed Sep. 2015 from www.apogeetranslite.com.
Clear-vu lighting Metroguide Pathlight, publication date unknown, document includes date of Sep. 25, 2013.
Apogee Translite, Series 70 LED Tunnel Light, Specification Sheet, copyright 2015.
Copyright 2014, Apogee Translite, Inc., series 99 EM LED, Spec Sheet.

* cited by examiner

LIGHT FIXTURE AND WIREWAY ASSEMBLY

CROSS REFERENCE TO RELATED APPLICATIONS

This application is a continuation of U.S. patent application Ser. No. 16/259,477 filed Jan. 28, 2019, which application claims the benefit of U.S. Provisional Patent application No. 62/623,431 filed Jan. 29, 2018; the disclosures of which both applications incorporated herein by reference.

BACKGROUND OF THE DISCLOSURE

1. Technical Field

The disclosure relates to light fixture and wireway assemblies and, more particularly, to low-profile assemblies. The disclosure relates to lighting systems and, more particularly, to an LED lighting system having a low profile with sealed light engines carried by mounts and used in combination with wireways. The disclosure particularly relates to LED lighting systems configured for use in public transportation facilities.

2. Background Information

Various public and private facilities have been retrofitting old incandescent and fluorescent lighting with light emitting diode (LED) lighting systems. In public transportation facilities, the retrofits must deal with limited ceiling heights often found in older infrastructure and the need to add multiple power and communications wires that did not exist in past installations.

SUMMARY OF THE DISCLOSURE

A light fixture and wireway assembly is provided in a low-profile configuration wherein at least a portion of a plurality of wireways are disposed in a stacked configuration with an LED light engine. The disclosure provides configurations wherein at least two wireways are disposed in a stacked configuration with a low-profile, edge-lit LED light engine. When the light fixture is disposed horizontally, the stacked configuration locates at least portions of two wireways directly between the light engine and the top wall of the fixture housing.

In one configuration, at least portions of two to four individual wireways are disposed in a stacked configuration with a low-profile, edge-lit LED light engine powered by an LED power supply also disposed within the outer perimeter of the overall fixture housing.

The assembly allows an LED power supply to be simultaneously connected to multiple power sources with the electrical connections disposed entirely within the outer perimeter of the fixture housing. Without extending through the outer perimeter of the fixture housing, the LED power supply has access to each of the wireways through only a single wall of each wireway.

The assembly provides a benefit of allowing wires to be tapped from a lateral tap (such as one disposed at a right angle to the assembly) into the plurality of wireways without running conduit above or below the fixture housing. These lateral taps can be run through the space that is normally occupied by the light engine. At the location of a lateral tap, the area that receives the light engine is empty (either between light engines or where a light engine is not installed) and the space normally-occupied by the light engine is used for the lateral taps. Using the space in this manner allows wires from the lateral tap to be connected to wires in the wireways without running conduits over the top or the bottom of the fixture housing. As such, the top of the fixture housing can be mounted directly against a beam or a ceiling without leaving space for wire conduits.

The assembly provides optional configurations with secondary and/or tertiary lighting fixtures that provide upwardly-directed lighting.

The disclosure provides an assembly that can be used to light the edge of a subway platform when mounted to the ceiling or beams above the platform.

The preceding non-limiting aspects of the assembly, as well as others, are more particularly described below. A more complete understanding of the equipment can be obtained by reference to the accompanying drawings, which are not intended to indicate relative size and dimensions of the assemblies or components thereof. In those drawings and the description below, like numeric designations refer to components of like function. Specific terms used in that description are intended to refer only to the particular structure of the embodiments selected for illustration in the drawings, and are not intended to define or limit the scope of the disclosure.

BRIEF DESCRIPTION OF THE DRAWINGS

Similar numbers refer to similar elements in the drawings.

DETAIL DESCRIPTION OF THE DISCLOSURE

The following detailed description illustrates by way of example, not by way of limitation, the principles of the invention. This description will clearly enable one skilled in the art to make and use the invention, and describes several embodiments, adaptations, variations, alternatives and uses of the invention. It should be understood that the drawings are diagrammatic and schematic representations of exemplary embodiments of the invention, and are not limiting of the present invention nor are they necessarily drawn to scale. Dimensions are provided as examples.

Exemplary configurations of a light fixture and wireway assembly 2 include at least one light engine 4 and at least two wireways 6. Assembly 2 is provided in exemplary low-profile cross sections using a low-profile, edge-lit LED light engine 4 to provide the light from assembly 2. An exemplary low-profile, edge-lit LED light engine is described below with reference to FIG. 8. Assembly 2 locates at least two wireways 6 and one light engine 4 within its interior that is defined by an outer perimeter. The components are disposed in a stacked configuration to provide a low profile assembly 2. The outer perimeter of assembly 2 is defined by the combination of one or more of the outer surfaces of fixture walls, wireway walls, portions of light engine 4, and/or doors.

Each wireway 6 defines an open passageway adapted to receive a cable or cables or a wire or wires such as is used to deliver power, communications, and/or data. Each assembly 2 includes at least one light engine 4 and at least two wireways 6 disposed in a stacked arrangement with light engine 4. Each wireway 6 is defined by at least a wall and a door. In the exemplary configuration, each wireway is generally rectangular and includes an upper wall, two side walls, and a lower door. In other configurations, the wireways can be round, oval, trapezoidal, or triangular in cross section. Adjacent wireways 6 share walls with the shared wall being a common wall with a single wall thickness. Alternatively, each wireway 6 is defined by its own wall or walls that are spaced from or directly abut other walls to define double thickness walls between adjacent wireways 6. The wireway walls define structures (such as channels 28) for mounting assembly 2 to a facility wall, facility ceiling, or a beam.

Each wireway 6 has its own access door 8 that can be opened and closed either by removing door 8 entirely or by pivoting door 8 between closed and open conditions using a hinge. A fastener such as a threaded fastener, a quarter-turn fastener, a half-turn fastener, or a snap-fit fastener can be used to hold door 8 closed. Gaskets or seals are optionally provided to seal each wireway 6.

In addition to the walls and doors that define wireways 6, assembly 2 also includes a fixture wall or fixtures walls and an optional fixture access door that either alone or in cooperation with wireway walls to define the fixture housing of assembly 2. In some configurations, the fixture walls define structures for mounting assembly 2 to a facility wall, facility ceiling, or a beam. The fixture walls also define spaces and mounting structures to receive light engine 4, an LED power supply 10, and to provide space for electrical connectors within assembly 2 but outside wireways 6. End caps 12 or end walls are used to close the ends of assembly 2 as needed. Wireways 6 and the fixture walls of assembly 2 can be extruded from suitable materials such as metals and polymers.

Figure 1:
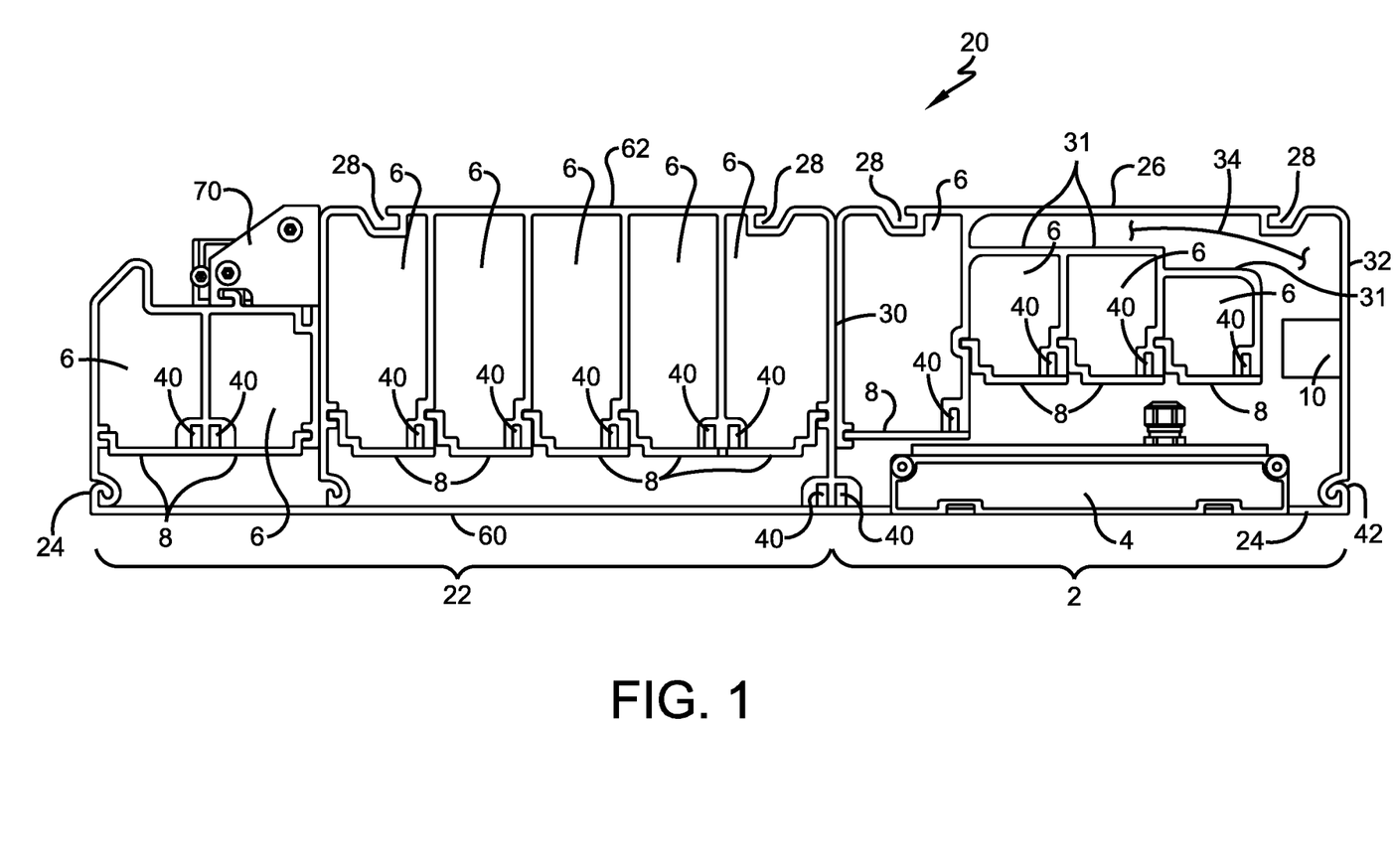
FIG. 1 is an end view of a first exemplary configuration of a light fixture and wireway assembly disposed next to a communications wireway.
Figure 2:
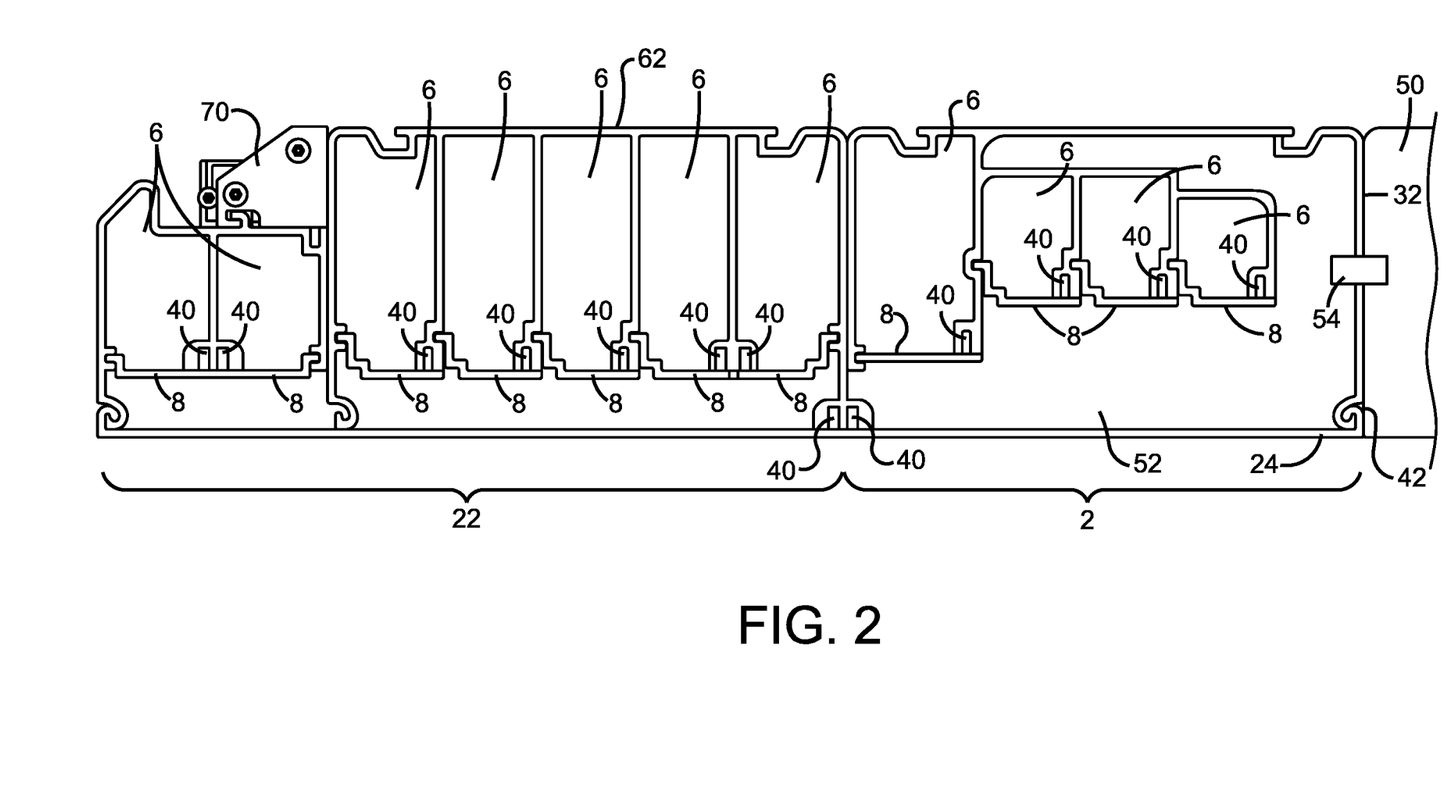
FIG. 2 is an end view of another portion of the first exemplary configuration where the light engine is not located and a lateral tap is connected.
Figure 7:
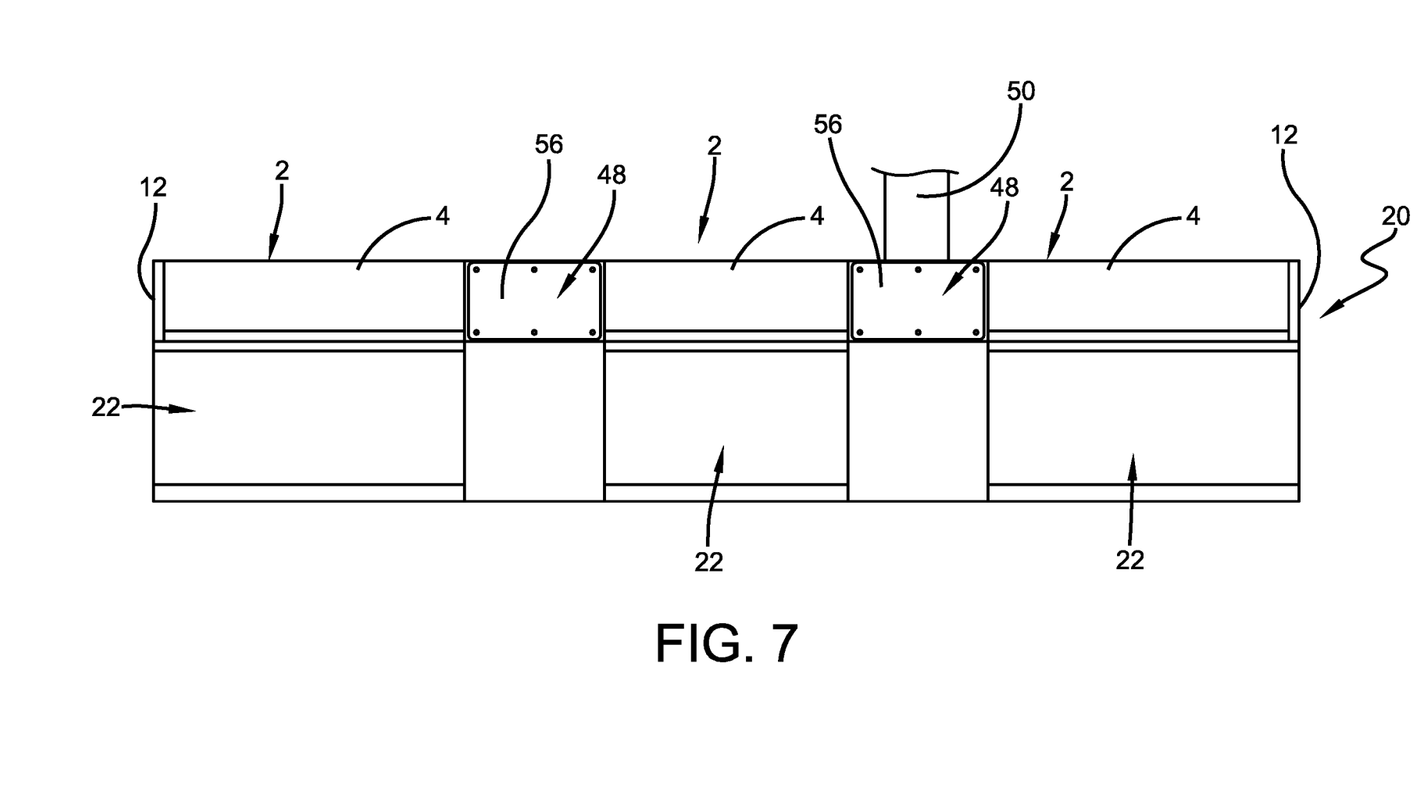
FIG. 7 is a bottom plan view of an assembly of having three light fixture and wireway assemblies disposed next to a communications wireway.

The exemplary combination 20 of FIGS. 1, 2, and 7 includes assembly 2 disposed next to a communications wireway assembly 22. These combinations 20 can be used above the edge of a subway platform. In this example, combination 20 is low-profile having a height of five or less inches. Assembly 2 has a compact width of less than nine inches (8.4 inches in the exemplary configuration) with assembly 22 having a width of less than 12.5 inches.

Figure 6:
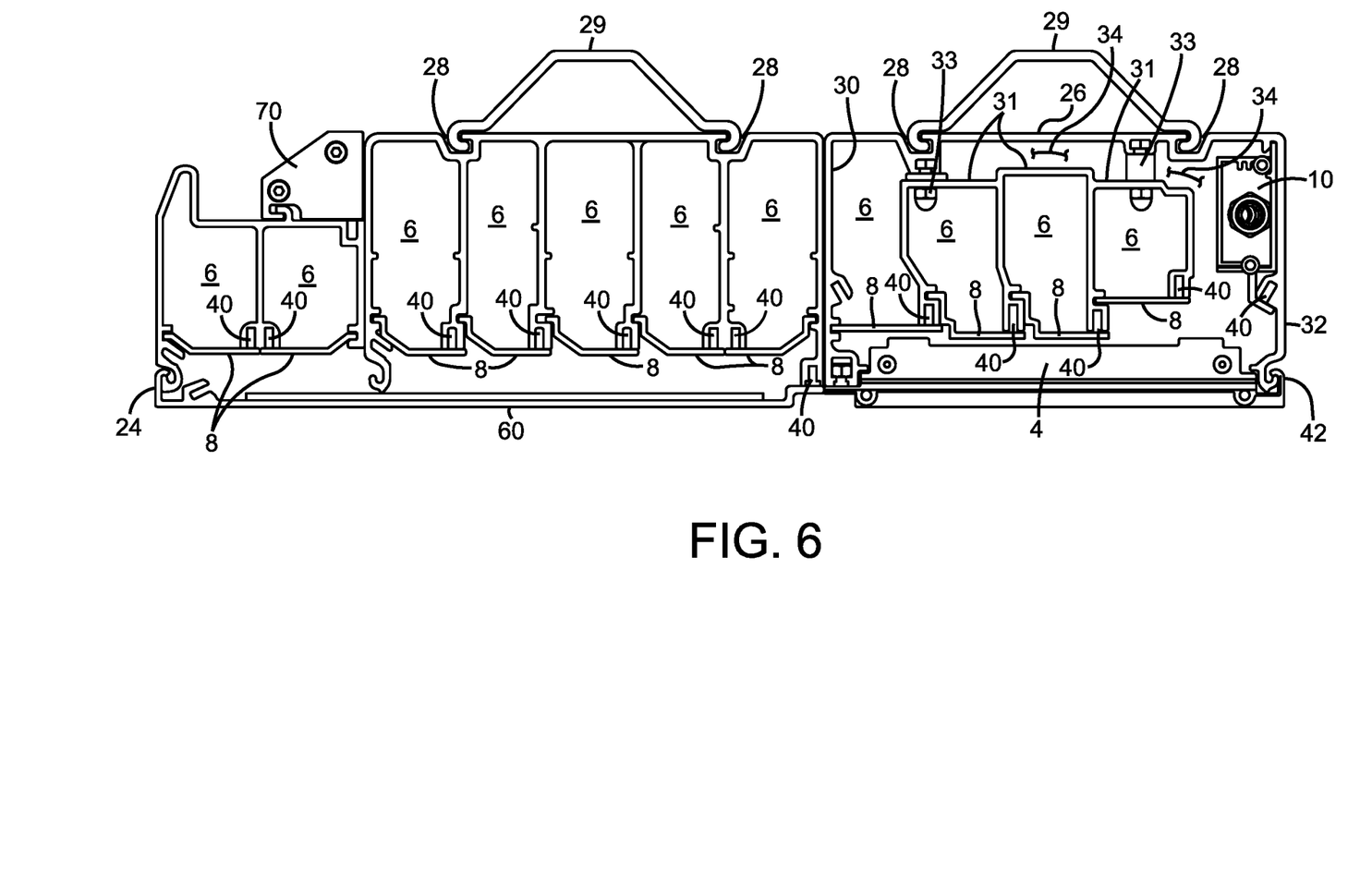
FIG. 6 is an end view of an optional alternative for the first exemplary configuration of the light fixture and wireway assembly of FIGS. 1 and 2.

Assembly 2 is configured as a low-profile light fixture and wireway assembly 2 with light engine 4 aligned in a stacked configuration with at least portions of two wireways 6. The exemplary configurations of FIGS. 1 and 6 provide the stacked configuration between light engine 4 with at least portions of four wireways 6. The stacked configuration locates portions of at least two or more wireways directly above (vertically above) light engine 4 when assembly 2 is horizontal or directly beside light engine 4 when assembly 2 is mounted vertically. In the exemplary configuration, light engine 4 is disposed directly below (vertically below) portions of four wireways 6 with assembly disposed horizontally. Assembly 2 is mounted horizontally as depicted in the drawings with top wall 26 disposed against or parallel with a horizontal ceiling or horizontal beam surface. In this position, portions of at least two wireways 6 are disposed directly between light engine 4 and top wall 26. Also, portions of light engine 4 are disposed directly between portions of at least two wireways 6 and the opening defined by door 24 through which light from light engine 4 shines. In this configuration, a portion of top wall 26 is shared as a common wall with wireway 6 on the left hand side of assembly 2. Top wall 26 defines mounting channels 28 used to receive fingers of a mount 29 to secure assembly 2 to a mounting structure. Assembly 2 can be mounted vertically with top wall 26 disposed vertically. When assembly 2 is mounted vertically, the stacked relationship is maintained with portions of at least two wireways 6 disposed directly (horizontally between) between light engine 4 and top wall 26.

Assembly 2 defines four wireways 6 with a base wireway 6 sharing a common wall with top wall 26. This configuration has the left-hand sidewall of the base wireway 6 sharing the left-hand sidewall 30 of the fixture housing as a common wall. In the exemplary configuration of the drawings, the base wireway is the left hand-side wireway. Three wireways 6 having their own top walls 31 spaced from top wall 26 extend from the base wireway across most of the width of the interior of the fixture housing. In another configuration, the arrangement of wireways 6 can be reversed with the base wireway being disposed on the right hand side of assembly 2. In the configuration of FIG. 6, hangers 33 support wireways 6 from top wall 26. In the configuration depicted in the drawings, the left hand wireway 6 can be used for lines for small power, the next middle wireway 6 can be used for normal power, the next middle wireway 6 can be used for reserve power, and the wireway 6 on the right can be used for emergency power. Other arrangements of the power lines can be used.

The three wireways having their own top walls 31 are cantilevered from or extend from the base wireway. The cantilevered wireways can be self-supported or supported with hangers 33 spaced along the length of wireways 6.

A wireway 6 that shares a portion of a fixture wall as a common wall such as top wall 26 and sidewall 30 is 'within the interior' of the fixture housing of assembly 2 in the context of this description.

As described above, each wireway 6 includes an access door 8 and in the FIG. 6 configuration these four doors 8 are each horizontal and disposed in substantially parallel reference planes with the two central doors 8 being disposed in the same reference plane. In the FIG. 1 configuration, door 8 on the base wireway 6 is disposed at a lower height within assembly 2 than the doors 8 for the other three wireways 6 which are disposed in the same reference plane. In both the FIG. 1 and FIG. 6 configurations, portions of all four doors 8 are disposed in the vertical space above light engine 4 and are spaced from light engine 4 to provide space for an electric connection between light engine 4 and power supply 10.

These configurations allow the open passageway of each wireway 6 to be accessed through only a single wireway wall because the interior of each wireway 6 is separated from the interior of the fixture housing by only a single wall in at least one location about the non-door perimeter of the wireway. In the example, power supply 10 is mounted to right-hand sidewall 32 and is disposed between wireways 6 and sidewall 32. Power supply 10 is powered by one or more of the power lines disposed in wireways 6 or from a power supply delivered from a lateral tap. The power connections can be made over the top of the three non-base wireways 6 as indicated by schematic line 34 (representing one or more electrical connections) with a sealed electrical fitting used where the connection passes through the wall.

Light engine 4 is either carried by door 24 (FIG. 1) or directly mounted to one or both sidewalls 30 and 32 such that light engine 4 functions as the door (FIG. 6) for assembly 2. When carried by door 24, light engine 4 is disposed at or through an opening or directs its light through an opening defined by door 24 or through a translucent window material carried by door 24. In some configurations, a portion of light engine 4 extends through door 24. Door 24 is held closed by a connector 40 (for example a threaded fastener, a quarter turn fastener, or a latch). Door 24 can be held closed by connectors 40 on both of its sides or door 24 is connected to a sidewall with a hinge 42 that allows door 24 and light engine 4 to swing down when open to provide access to light engine 4, all of wireway doors 8, and power supply 10. In the FIG. 1 configuration, the outer perimeter wall of assembly 2 includes top wall 26, left hand sidewall 30, right hand sidewall 32, and door 24. In the configuration of FIG. 6, the housing of light engine 4 includes hinge 42 and a flange that supports connector 40 for holding light engine 4 in place with respect to walls 30 and 32. When connector 40 is released, light engine 4 pivots down on hinge 42 to its open position and functions as the door itself. In this configuration, the outer perimeter wall of assembly 2 includes top wall 26, left hand sidewall 30, and right hand sidewall 32.

Figure 9:
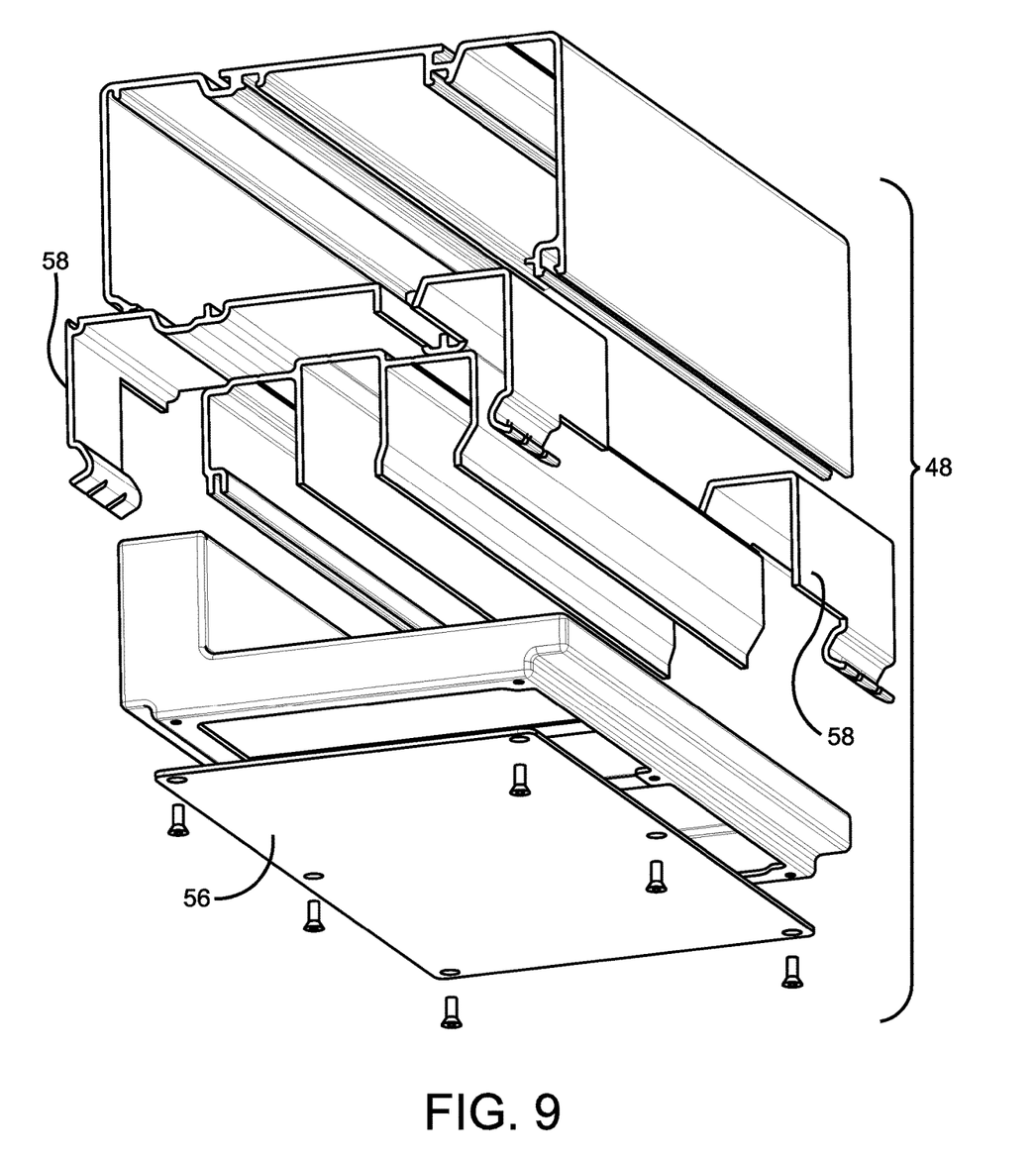
FIG. 9 is an exploded view of a tap box (shown from rear).
Figure 10:
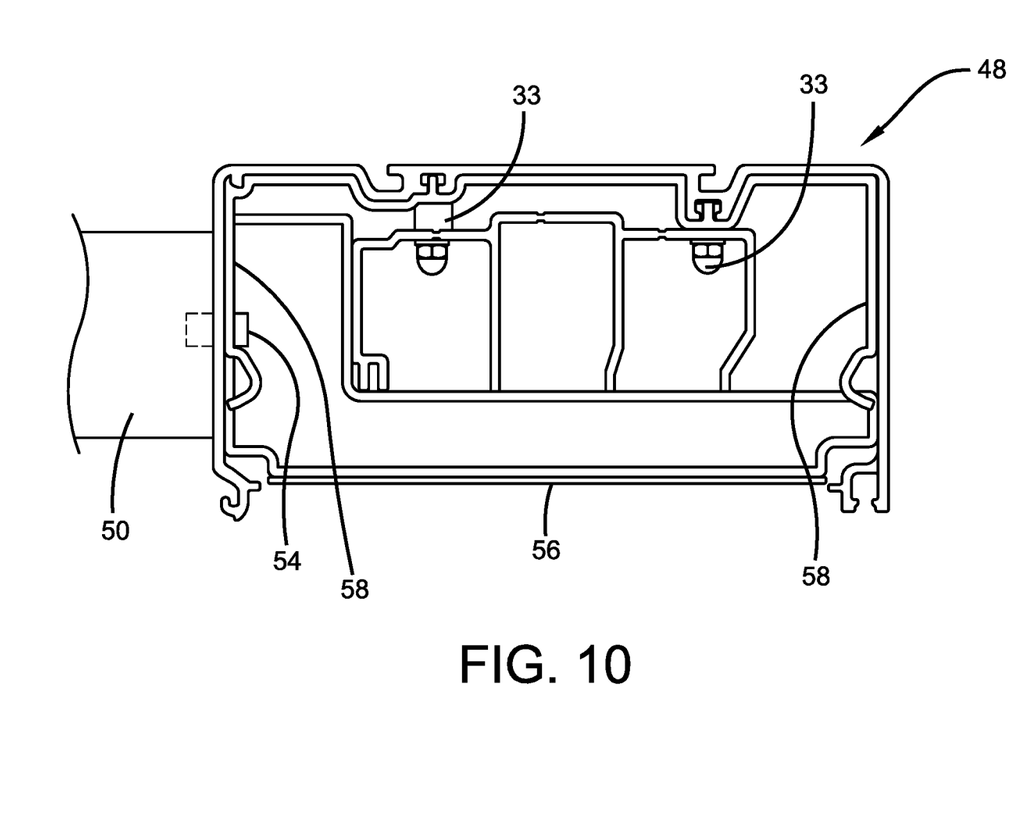
FIG. 10 is a section view of the tap box of FIG. 9 with a lateral tap.

Assembly 2 is elongated in a longitudinal direction. FIG. 7 depicts a configuration with three spaced light engines 4. Each can be four to six feet long. These can be abutted against each other or spaced apart by tap boxes 48 as shown in FIG. 7. When abutted together, the areas between the ends of light engines 4 can be used to receive a lateral tap 50 (FIG. 2) that is brought in from the side of assembly 2 to allow one or more wires to be tapped and extend from the wireways 6 from assembly 2. Alternatively, tap box 48 (FIGS. 7 and 9-10) is disposed between assemblies 2 to provide the space for lateral tap 50 and a door 56 for accessing the connections.

Lateral tap 50 thus does not have to be disposed above or below assembly 2 to allow the wires to be tapped. The wires being tapped also do not have to extend above or below assembly 2 to reach lateral tap 50. This provides a clean appearance to the junction of tap box 48, lateral tap 50, and assembly 2 and completely contains the electrical connections without conduit being disposed on the exterior of assembly 2. Lateral tap 50 can have a height less than assembly 2 or the same height as shown in FIG. 2. For example, the wires in assembly 2 can be tapped through their doors 8 or over the top of wireways 6. The wires carried within assembly 22 can be pulled through wall 30 (and the right hand side wall of assembly 22) to reach lateral tap 50 through the space 52 normally-occupied by light engine 4. A sealed electrical connector 54 can be used between lateral tap 50 and assembly 2. When tap box 48 is used, its cross section matches the cross section of the fixture housing and includes wireways that match and are aligned with wireways 6. Connectors 58 extend between assembly 2 and tap box 48 to connect the two in an end-to-end configuration.

Assembly 22 includes seven wireways 6 disposed within a common door 60 that is hinged in the same manner as door 24. Doors 8 for each wireway 6 are spaced from door 60 to provide room for connections. These seven wireways 6 can be used for communication power, CCTV, data, public announcement, fiber, small power, and spare. The first five wireways 6 share a common top wall 62 that defines mounting channels 28.

In this configuration, the sixth and seven wireways disposed on the left-hand side of assembly 22 are shorter than wireways one through five with an LED up-lighting engine 70 carried above these two wireways.

In addition to having a low profile, the combination of assembly 2 and assembly 22 have a width substantially less than space required for the same features in the prior art. The width of the exemplary configuration of FIG. 1 is 20.616 inches compared to over 33 inches in the prior art. The compact configuration provides a benefit for fitting the same items in a smaller space.

Figure 3:
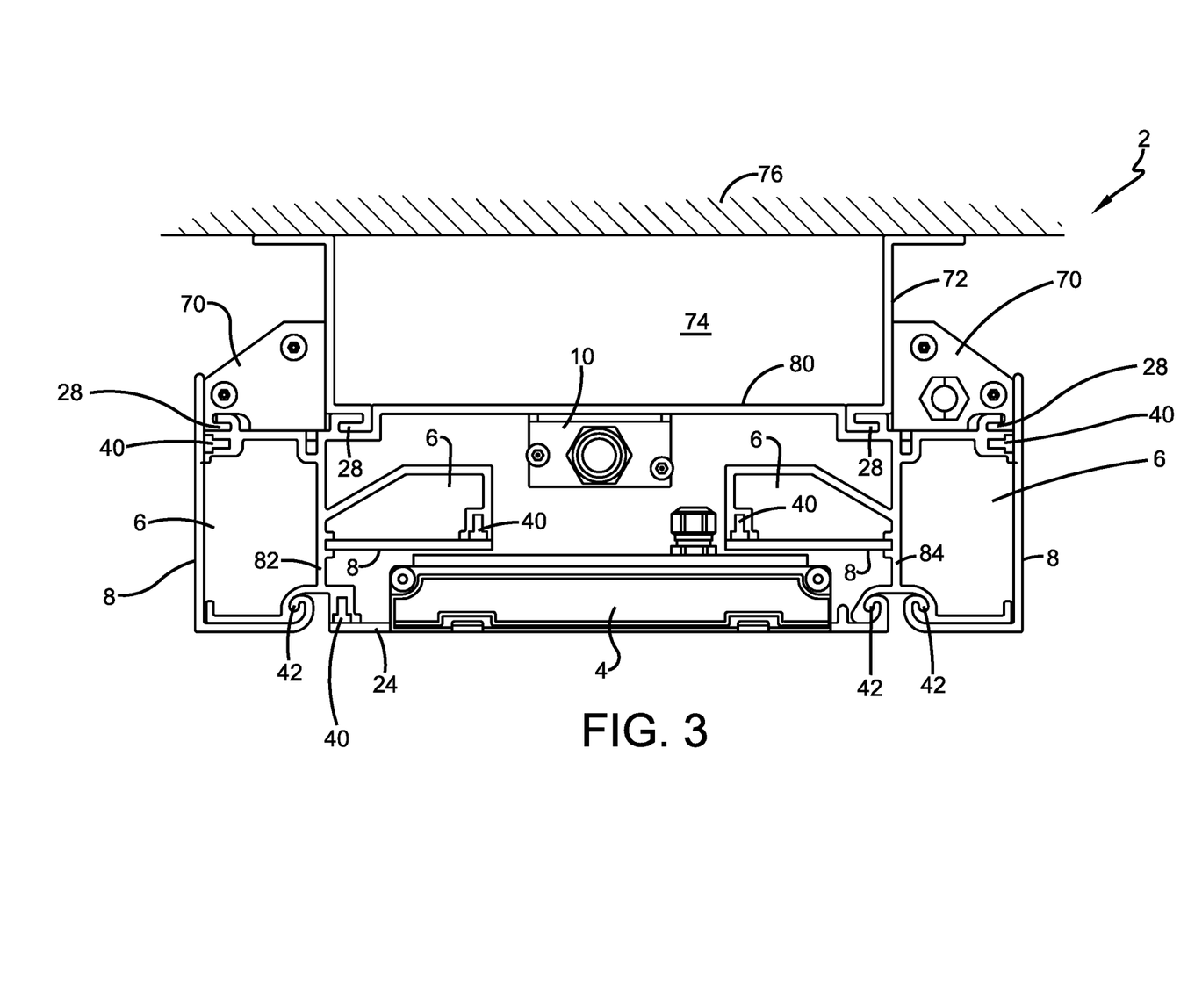
FIG. 3 is an end view of a second exemplary configuration of a light fixture and wireway assembly.
Figure 4:
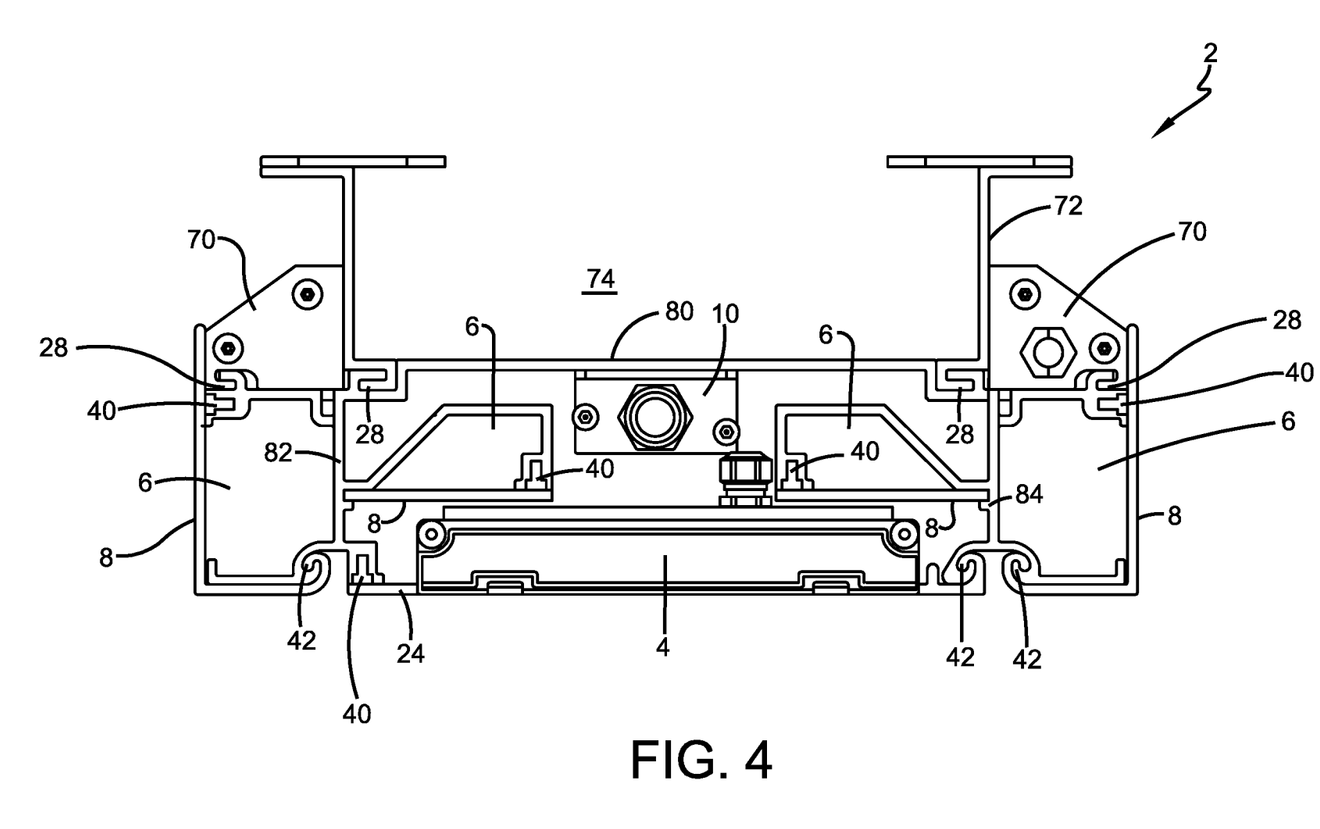
FIG. 4 is an end view of a third exemplary configuration of a light fixture and wireway assembly.
Figure 5:
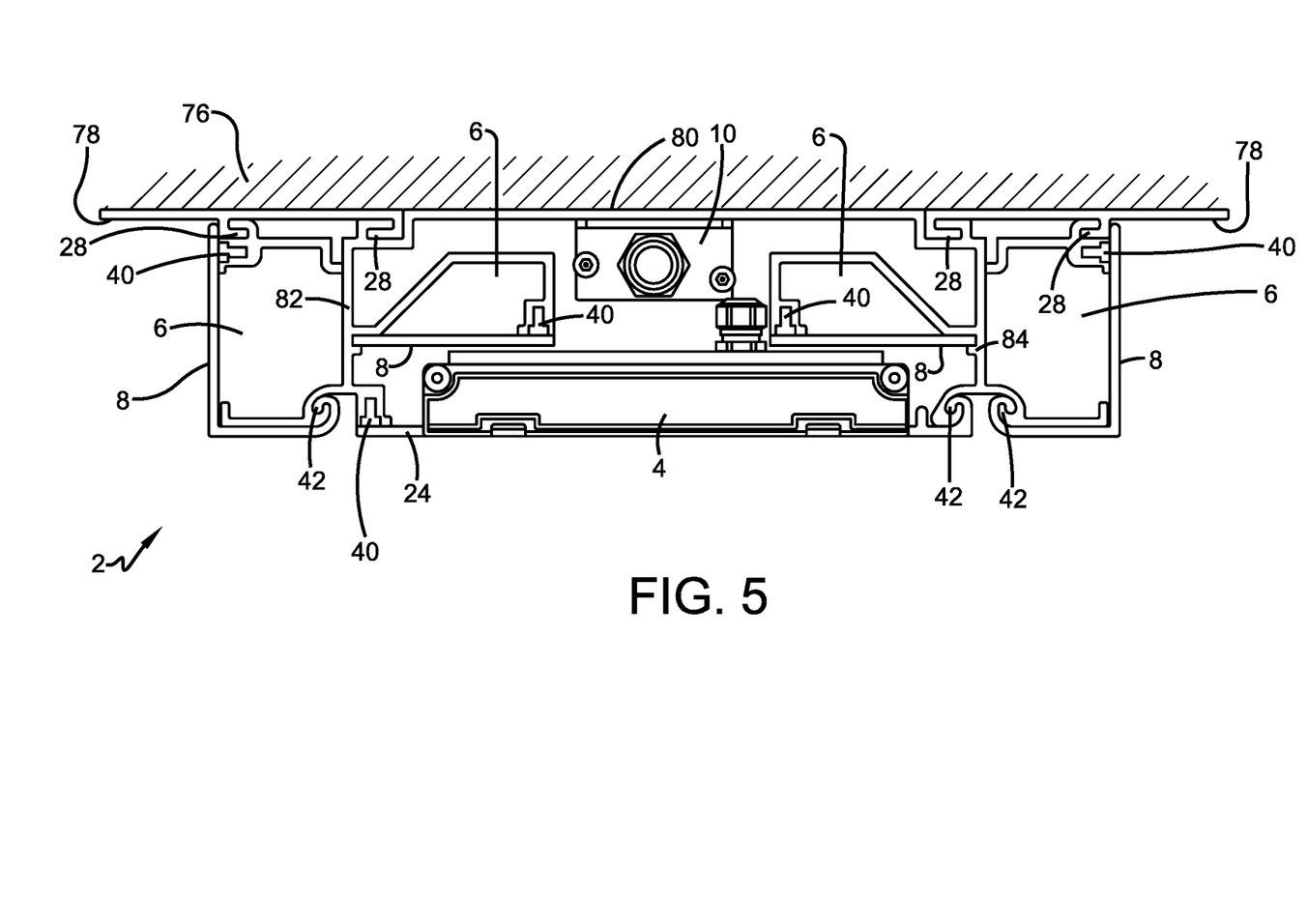
FIG. 5 is an end view of a fourth exemplary configuration of a light fixture and wireway assembly.

The assembly configurations of FIGS. 3 and 4 are beam-mounted wherein portions of light fixture 70 are disposed at the sides of the bracket 72 that mounts assembly 2 to a beam 74 that extends down from ceiling 76. The assembly configuration of FIG. 5 is flush mounted to ceiling 76 with brackets 78. These assemblies can be used in the mezzanine areas of a subway facility. These brackets allow assemblies 2 to be mounted with connectors from outside the electrical compartments and wireways 6. The FIG. 3 configuration has a main body height below beam 74 of 3.25 inches and the FIG. 4 configuration is more compact with a main body height below beam 74 of 2.9 inches. The FIG. 5 configuration has a main body height of three inches below ceiling 76. Each has a main body width of 12.45 inches.

Each of these configurations for assembly 2 includes four wireways 6 with two wireways 6 disposed in the stacked configuration with light engine 4. The stacked configuration includes portions of two wireways 6 disposed directly between light engine 4 and top wall 80. Power supply 10 is disposed above light engine 4 and is connected to top wall 80 between the two wireways 6 that are disposed in the stacked configuration. The other two wireways 6 are disposed on the right and left hand sides of assembly 2 with the doors 8 of these wireways 6 opening from the sides of assemblies 2. Light engine 4 is carried by door 24 as described above or is carried by sidewalls 82 and 84 of assembly 2. The electrical connection between a power line carried within a wireway 6 and power supply 10 can be achieved through only one wall of a wireway and the connection is entirely internal to assembly 2.

In the configurations of FIGS. 3 and 4, top wall 80 defines channels 28 which receive bracket 72 and another set of channels 28 which receive connectors from light fixtures 70 which provide up-lighting. In the FIG. 5 configuration, top wall 80 defines pairs of channels 28 which receive brackets 78.

Figure 8:
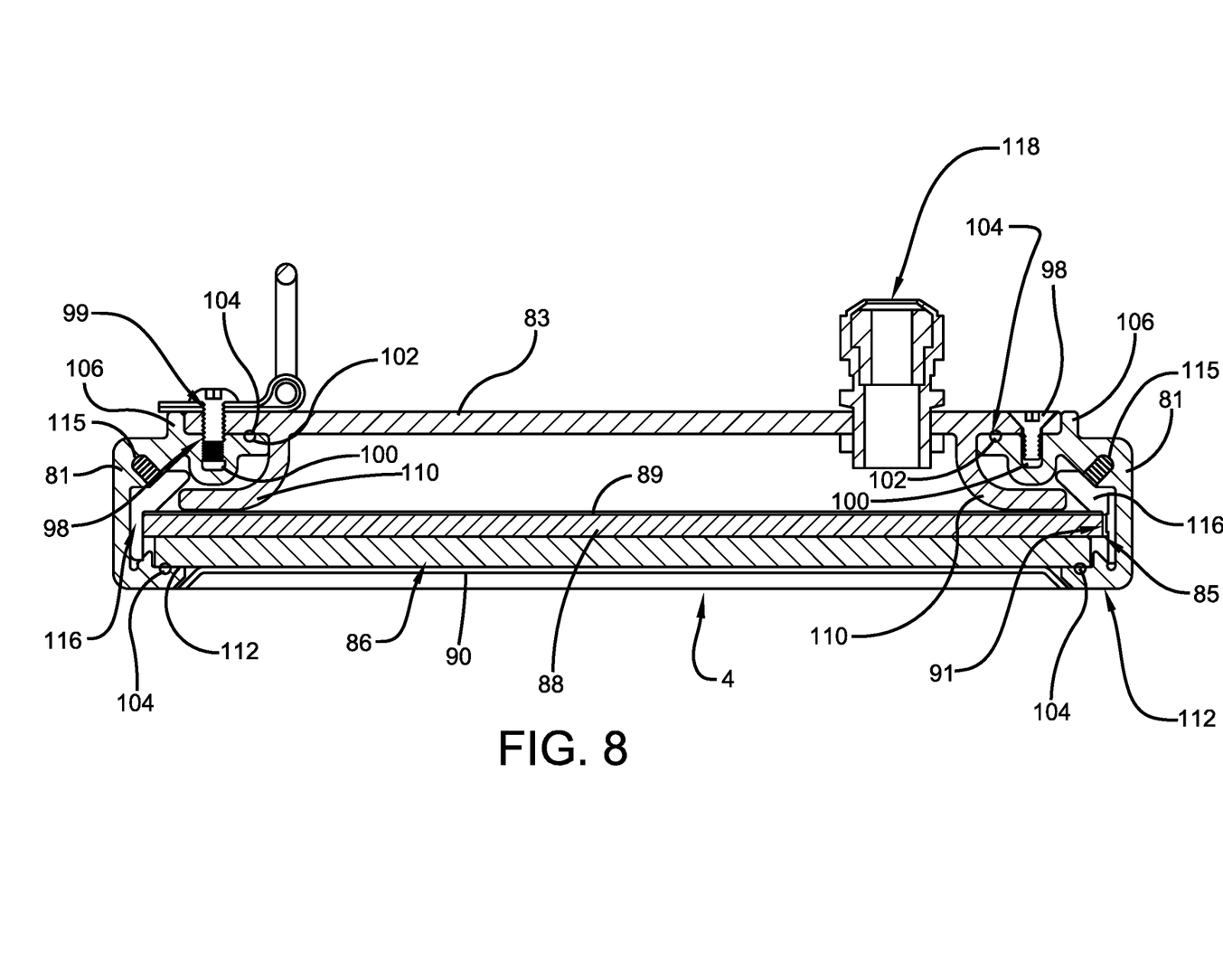
FIG. 8 is an end view of an exemplary low profile, edge-lit light engine.

An exemplary light engine 4 is depicted in FIG. 8 and includes sidewalls 81, a top plate 83, at least one LED light strip 85, a diffuser or diffuser assembly 86, and end caps. Top plate 83 can be aluminum or a polymer. Sidewalls 81 can be extruded from a metal such as aluminum or a polymer. Diffuser assembly 86 can include only a diffuser or a diffuser combined with one or more of a reflector 89, a light guide plate 88, and a cover 90. In the exemplary configuration, light engine 4 is an edge-lit unit that includes a light guide plate 88 with a reflector 89 disposed along its top so that all of the light is directed out the bottom of the diffuser. Light engine 4 can include a single LED light strip 85 or a pair of LED light strips 85 on either side of light guide plate 88. Each LED light strip 85 can include a plurality of LED light strip units arranged end-to-end with each carrying a plurality of LED circuits. In the edge lit configuration, each LED is closely positioned to, spaced by a spacer 91, or can directly contact the exposed edges of light guide plate 88 so that almost all the light generated by the LEDS is directed into light guide plate 88. Light guide plate 88 distributes the light and directs it to diffuser 86. Diffuser 86 can include an optional glass or polymer cover 90.

End caps are fastened to the ends of sidewalls 81 with fasteners. A seal or gasket can be provided on the inner contact surface of each end cap to seal the interior of light engine 4.

Top plate 83 is secured to sidewalls 81 with fasteners 98 that extend through top plate 83 into fastener channels 100 defined by upper inwardly-disposed projections of sidewalls 81. Inwardly (towards the middle of light engine 4) of fastener channels 100, each upper inwardly-disposed projection of sidewall 81 defines a seal recess 102 that receives a seal such as an O-ring seal 104 that is compressed when fasteners 98 are tightened to seal light engine 4. Each sidewall 81 also defines an upwardly projecting abutment wall 106 that contains top plate 83. Top plate 83 includes flanges 110 which project under the inwardly projecting portions of sidewalls 81 that define channels 100 and 102. These flanges function as compression features or compression members for the seals of light engine 4 which seals can be O-rings. Flanges 110 are sized to engage the inner (or upper) surface of the diffuser assembly such as against the top of light guide plate 88 (or reflector 89) (or flanges can resiliently push on light guide plate 88 or reflector 89) to force light guide plate 88, diffuser 86, and cover 90 against seals such as O-rings 104 carried by the upper surfaces of the lower inwardly-disposed projections 112 of sidewalls 81. Portions of flanges 110 can be disposed directly between fastener 98 and O-ring 104 carried by projection 112. O-rings 104 in combination with the gasketed end caps seal the interior of light engine 4. This sealing configuration provides a waterproof seal to light engine 4. Sidewalls 81 define corner slots that allow sidewalls 81 to have some resilience if desired to create the clamping force. Corner slots also receive fasteners 115 that mount retainers 116 that hold LED light strip 85 in place. Flanges 110 are used to force the diffuser assembly down against the lower seals with only the force from fasteners 98 from the top of light engine 4. The light engine does not use fasteners that extend up from the bottom which allows projections 112 to be small to provide a wide opening for the distribution of light from light engine 4.

The power supply 10 for light engine 4 can be carried on top of light engine 4 or power supply 10 can be mounted to a fixture or wireway wall. One power supply 10 can supply power to a single light engine 4 or to a plurality of light engines 4. Power supply 10 can be connected to light engine 4 with an electrical connector that provides a quick release and reconnect (IP65 quick connect plug or quick disconnect plug) to provide for easy removal and replacement. The power line can extend through top plate 83 or end cap or sidewall 81 with a sealed configuration 118. Power supply 10 can be connected to a power supply line or multiple power supply lines with a quick connectors to allow for removal and replacement of power supply 10. Power supply 10 can be configured to accept power from different sources at different voltages such as 110-220V and high power 600V. Power supply 10 also can accept battery power for emergency situations.

In the foregoing description, certain terms have been used for brevity, clearness, and understanding. No unnecessary limitations are to be implied therefrom beyond the requirement of the prior art because such terms are used for descriptive purposes and are intended to be broadly construed. Moreover, the descriptions and illustrations of the exemplary configurations are examples and the invention is not limited to the exact details shown or described. Modifications and alterations of those embodiments will be apparent to one who reads and understands this general description. The present disclosure should be construed as including all such modifications and alterations insofar as they come within the scope of the appended claims or equivalents thereof. Throughout the description and claims of this specification the words "comprise" and "include" as well as variations of those words, such as "comprises," "includes," "comprising," and "including" are not intended to exclude additives, components, integers, or steps.

The invention claimed is:

1. A wireway and light fixture assembly comprising:
   an outer perimeter wall defining an assembly interior; the outer perimeter wall including a top wall;
   an LED light engine;
   first and second wireways disposed within the assembly interior;
   the first and second wireways being disposed side-by-side;
   the first wireway having at least one wireway wall and a first wireway door openable into the assembly interior and the second wireway having at least one wireway wall and a second wireway door openable into the assembly interior;
   an interior of the first wireway being separated from the assembly interior by only a single wireway wall;
   an interior of the second wireway being separated from the assembly interior by only a single wireway wall; and
   the LED light engine and the first and second wireways being disposed with portions of each of the first and second wireways being disposed between the LED light engine and the top wall.

2. The assembly of claim 1, wherein the first and second wireways share a common wall.

3. The assembly of claim 1, wherein the LED light engine is selectively movable between closed and open positions with respect to the assembly interior; the open position of the LED light engine providing access to both of the first and second wireways.

4. The assembly of claim 3, wherein, when the LED light engine is in the open position, the first wireway door is accessible without opening the second wireway door and the second wireway door is accessible without opening the first wireway door.

5. The assembly of claim 4, further comprising a communications wireway assembly disposed outside the outer perimeter wall; the communications wireway assembly includes a plurality of wireways disposed behind a common door.

6. The assembly of claim 5, wherein each of the wireways of the communications wireway assembly has its own wireway door.

7. The assembly of claim 1, further comprising an LED power supply disposed within the assembly interior.

8. The assembly of claim 1, wherein the outer perimeter wall is elongated in a longitudinal direction; the first and second wireways being parallel to each other and to the light engine in the longitudinal direction.

9. The assembly of claim 1, further comprising a third wireway; at least one of the first and second wireways being connected to the third wireway.

10. The assembly of claim 9, wherein a portion of the third wireway is disposed directly between the LED light engine and the top wall of the outer perimeter wall.

11. The assembly of claim 9, further comprising a fourth wireway.

12. The assembly of claim 11, wherein a portion of the fourth wireway is disposed directly between the LED light engine and the top wall of the outer perimeter wall.

13. A wireway and light fixture assembly comprising:
an outer perimeter wall defining an assembly interior; the outer perimeter wall including a top wall;
an LED light engine that is selectively movable between closed and open positions with respect to the assembly interior;
first and second wireways disposed within the assembly interior;
the first and second wireways being disposed side-by-side; the first and second wireways sharing a common wall;
the first wireway having a first wireway door openable into the assembly interior and the second wireway includes a second wireway door openable into the assembly interior;
an interior of the first wireway being separated from the assembly interior by only a single wireway wall;
an interior of the second wireway being separated from the assembly interior by only a single wireway wall;
the open position of the LED light engine providing access to both of the first and second wireway doors; the first wireway door being accessible without opening the second wireway door and the second wireway door being accessible without opening the first wireway door; and
the LED light engine and the first and second wireways being disposed with portions of each of the first and second wireways being disposed between the LED light engine and the top wall.

14. The assembly of claim 13, further comprising a third wireway; at least one of the first and second wireways being connected to the third wireway.

15. The assembly of claim 14, wherein a portion of the third wireway is disposed directly between the LED light engine and the top wall of the outer perimeter wall.

16. The assembly of claim 14, further comprising a fourth wireway.

17. The assembly of claim 16, wherein a portion of the fourth wireway is disposed directly between the LED light engine and the top wall of the outer perimeter wall.

18. The assembly of claim 13, further comprising a communications wireway assembly disposed outside the outer perimeter wall; the communications wireway assembly includes a plurality of wireways disposed behind a common door.

19. The assembly of claim 18, wherein each of the wireways of the communications wireway assembly has its own wireway door.

20. A wireway and light fixture assembly comprising:
an outer perimeter wall defining an assembly interior; the outer perimeter wall including a top wall;
an LED light engine that is selectively movable between closed and open positions;
first, second, third, and fourth wireways disposed within the assembly interior;
the first, second, third, and fourth wireways being disposed side-by-side;
the first wireway having a first wireway door; the second wireway includes a second wireway door; the third wireway having a third wireway door; the fourth wireway having a fourth wireway door;
the open position of the LED light engine providing individual access to the first, second, third, and fourth wireway doors; and
the LED light engine and the first, second, third, and fourth wireways being disposed with portions of each of the first, second, third, and fourth wireways being disposed between the LED light engine and the top wall.

21. The assembly of claim 20, further comprising a communications wireway assembly disposed outside the outer perimeter wall; the communications wireway assembly includes a plurality of wireways disposed behind a common door.

22. The assembly of claim 21, wherein each of the wireways of the communications wireway assembly has its own wireway door.

23. A wireway and light fixture assembly comprising:
an outer perimeter wall defining an assembly interior; the outer perimeter wall including a top wall;
an LED light engine that is selectively movable between closed and open positions with respect to the assembly interior;
first and second wireways disposed within the assembly interior;
each of the first and second wireways being individually accessible when the LED light engine is disposed in the open position;
the LED light engine and the first and second wireways being disposed with portions of each of the first and second wireways being disposed between the LED light engine and the top wall;
a communications wireway assembly disposed outside the outer perimeter wall; the communications wireway assembly including a plurality of wireways disposed behind a common door; and
each of the wireways of the communications wireway assembly having its own wireway door.

24. The assembly of claim 23, wherein the first and second wireways share a common wall.

25. The assembly of claim 23, wherein one of the first and second wireways share a common wall with the outer perimeter wall.

26. The assembly of claim 23, wherein the first wireway has a first wireway door and the second wireway includes a second wireway door.

27. The assembly of claim 26, wherein, when the LED light engine is in the open position, the first wireway door is accessible without opening the second wireway door and the second wireway door is accessible without opening the first wireway door.

28. The assembly of claim 26, wherein the first and second wireway doors are spaced from the LED light engine when the LED light engine is in its closed position.

29. The assembly of claim 23, wherein an outer perimeter wall of the communications wireway assembly has a top wall aligned with the top wall of the wireway and light fixture assembly.

30. The assembly of claim 23, wherein the common door is aligned with the LED light engine when the LED light engine is in the closed position.

31. A wireway and light fixture assembly in combination with a communications wireway, the combination comprising:
- a wireway and light fixture assembly having an outer perimeter wall defining an assembly interior; the outer perimeter wall including a top wall;
- an LED light engine carried by the outer perimeter wall;
- first and second wireways disposed within the assembly interior;
- an interior of each wireway being separated from the assembly interior by only a single wireway wall;
- the first wireway having a first wireway door openable to the assembly interior and the second wireway having a second wireway door openable to the assembly interior;
- a communications wireway assembly disposed adjacent to the wireway and light fixture assembly; the communications wireway assembly including a plurality of communications wireways disposed behind a common door; and
- the outer perimeter wall of the communications wireway assembly having a top wall aligned with the top wall of the wireway and light fixture assembly.

32. The assembly of claim 31, wherein each of the wireways of the communications wireway assembly has its own wireway door.

33. The assembly of claim 31, wherein the outer perimeter wall is elongated in a longitudinal direction; the first and second wireways being parallel to each other and to the light engine in the longitudinal direction.

34. The assembly of claim 31, wherein the wireway and light fixture assembly includes a third wireway; at least one of the first and second wireways being connected to the third wireway.

35. The assembly of claim 34, wherein the wireway and light fixture assembly includes a fourth wireway.

36. The assembly of claim 31, wherein the LED light engine is selectively movable between closed and open positions; the open position of the LED light engine providing access to both of the first and second wireways.

37. The assembly of claim 33, wherein, when the LED light engine is in the open position, the first wireway door is accessible without opening the second wireway door and the second wireway door is accessible without opening the first wireway door.

* * * * *

UNITED STATES PATENT AND TRADEMARK OFFICE
CERTIFICATE OF CORRECTION

PATENT NO. : 10,760,781 B2  Page 1 of 1
APPLICATION NO. : 16/593652
DATED : September 1, 2020
INVENTOR(S) : Lax et al.

It is certified that error appears in the above-identified patent and that said Letters Patent is hereby corrected as shown below:

In the Claims

In Column 12, Line 18, in the first line of Claim 37, replace "33" with -- 36 --.

Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*